Oct. 4, 1949.   H. P. SMITH   2,483,508
APPARATUS FOR TRIMMING FISH
Filed Nov. 10, 1945

INVENTOR.
HERBERT P. SMITH
BY
ATTORNEY.

Patented Oct. 4, 1949

2,483,508

UNITED STATES PATENT OFFICE 2,483,508

APPARATUS FOR TRIMMING FISH

Herbert P. Smith, Eastport, Maine, assignor to Riviera Packing Company, Eastport, Maine, a partnership composed of Victor N. Cory and Arnold Vogl Application November 10, 1945, Serial No. 627,921

5 Claims. (Cl. 17—3)

This invention relates to a system of trimming fish, particularly to a method and apparatus for cutting the tails and heads of conveyor-carried fish and removing the entrails therefrom.

In the conventional methods of performing the fish trimming operations above-mentioned, considerable difficulty is generally experienced in removing the entrails, it being frequently necessary to employ tedious manual methods to obtain satisfactory results. And it is also a commonly recognized shortcoming of such conventional systems that the entrails are not always pulled out neatly and completely, thereby leaving jagged edges and portions of the entrails extending therefrom.

It is within the contemplation of my invention to eliminate these shortcomings in a system of the above-described category. More specifically, it is an object of my invention to enable trimming operations to be mechanically performed on conveyor-carried fish, whereby a removal is effected not only of the tails and heads, but also of the entrails, and in a manner whereby all severed portions are clean-cut and no remnants of the entrails extend from the cut edges.

In the attainment of certain of the above-mentioned objectives of my invention, I employ means to sever the head of a fish and to either completely extract the entrails or pull them out in a state of tension, and thereafter directing the stretched entrails into the path of a trimming knife.

It is also within the contemplation of my invention to provide a relatively simple and easily operated apparatus capable of performing the above objectives.

Other objects, features and advantages will appear from the drawings and the description hereinafter given.

Referring to the drawings.

Figure 2:
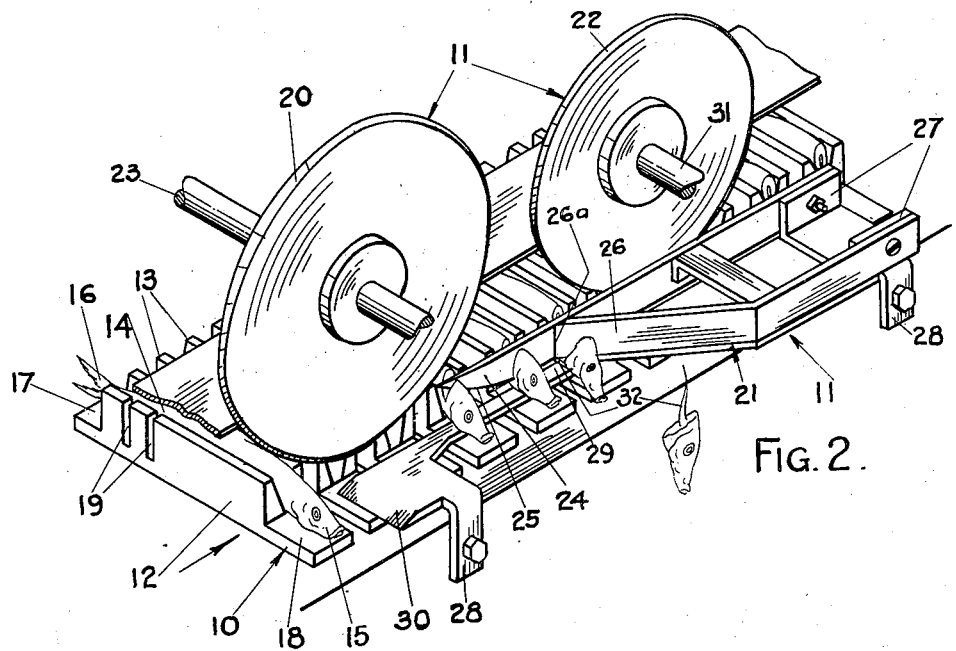
Figure 2 is an enlarged perspective of that portion of the apparatus containing the trimming and cutting elements.
Figure 1:
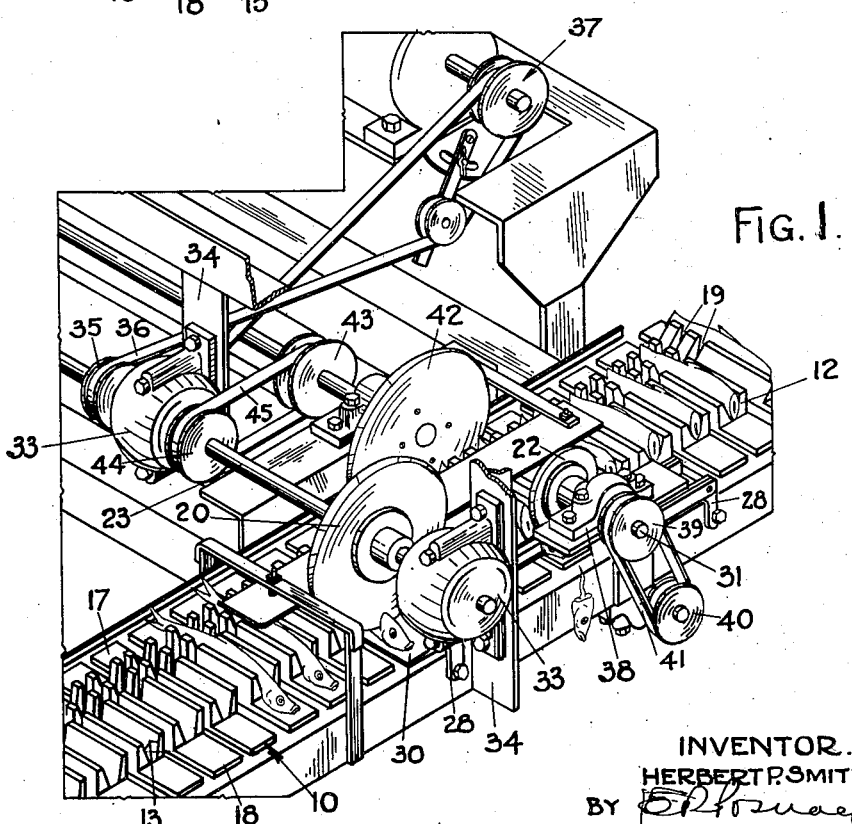
Figure 1 is a fragmentary perspective of the apparatus of my invention.

In the mechanical embodiment of my invention illustrated in the drawings, the fish are carried on a conveyor belt 10 towards the operative mechanism 11 containing the trimming and cutting elements to be hereinafter described.

The conveyor system comprises a plurality of racks 12 extending transversely with respect to the direction of travel, and containing parallel walls 13 for holding fish 14 therebetween. The length of each of said walls 13 is such as to permit the heads 15 and tails 16 to extend therebeyond and be supported by the oppositely disposed rests 18 and 17, respectively. Each of the walls 13 contains slots 19 to accommodate a tail cutting knife, it being preferred, although not required, that there be two adjacent slots in each wall, so that a circular tail-cutting knife may be operatively accommodated in one selected longitudinal series of said slots in accordance with the size of the fish or the portion thereof to be severed.

The head 15 of the fish is placed directly in the path of the cutting and entrail-removing mechanism comprising a preliminary head-cutting knife 20, a plow 21 and a trim knife 22.

The said head-cutting knife 20 is, in the particular form of my invention illustrated, of circular structure, being affixed to the rotatably mounted shaft 23. The plow member 21 contains a separating member 24, illustrated as a stationary blade with a forwardly disposed inclined entering edge 25—a wedge-shaped plow or pulling member 26, illustrated as an outwardly and rearwardly sloped bar with leading edge 26a—and a structural support 27 for the said blade and separator. The entire plow member 21 is secured through lugs 28 to the stationary framework of the apparatus. In the preferred form of my invention illustrated, the plow member is provided with a platform 29 as a support for the fish heads 15 during the cutting and trimming operations, the forward portion 30 of the said platform being inclined so as to engage the underside of each approaching head and elevate it to the best predetermined level for the operative steps to be performed thereon. The trim knife 22 is, in its preferred form, also circular, being fixedly mounted on rotatable shaft 31.

The three coacting head-engaging elements—the preliminary head-cutting knife 20, the separator 24 and the trim knife 22—are all in substantially longitudinal alignment, so that they will all operatively engage the oncoming heads in the same region.

In the operation of this apparatus, the fish 14 within racks 12 are carried by the conveyor belt 10 in the direction of the arrow. As a fish engages the rotary knife 20, a cut is made partially through the head, the said knife being adjusted so as to effect a cut of a predetermined depth. As the fish reaches the plow member 21, the stationary separator blade 24 enters the original cut, partially separating the head 15 from the body. When the fish reaches the oblique wall 26 and thereafter continues on its conveyor path, the head 15 is forced into slidable engagement with said wall, and is accordingly detached from its body as it is being forced outwardly by said wall 26.

During this operation the entrails 32 are also being pulled outwardly. In some instances all the entrails are removed by this action, but in many cases shreds are left hanging, and in many other cases the entrails are still anchored within the body of the fish, the outwardly extending portion being held in a stretched condition by the action of pulling member 26. As the fish continues its movement on the conveyor, it engages the rotating knife 22 disposed directly in the path of the cut. This knife then completes the operation by cutting any stretched entrails, and by trimming any jagged edges that may have been produced by the action of the plow. Wherever necessary, the position of the trim knife 22 can be positioned slightly inwardly towards the body of the fish, so as to assure a clean cut.

In the particular form of the apparatus illustrated, the shaft 23 is rotably mounted within bearings 33 suitably supported on framework 34, said shaft being connected through pulley 35 and belt 36 to a motive source generally designated as 37. Shaft 31 is rotably mounted within bearing 38, and is connected by pulleys 39 and 49 and belt 41 to motive source 37 by connecting means not shown but well understood in the art. The tail knife 42, adapted to enter the slots 19, is also connected to the motive source 37 by pulleys 43 and 44 and belt 45. The drive for the conveyor system may be of any conventional system known in the art, and not being a part of this invention, is not here described.

It is understood that other additional forms and modifications of the apparatus and adaptations of the method constituting this invention can be employed beyond and in addition to those hereinabove described, all within the scope of the appended claims.

I claim:

1. In an apparatus for trimming fish, a head cutting and entrail removing mechanism, and conveyor means for carrying fish to said mechanism; said means being adapted to operatively support fish transversely disposed to the direction of travel; said mechanism comprising preliminary cutting means so disposed with respect to the conveyor means as to be in the path of the head portions of fish operatively carried thereby, and so set as to partially cut through said head portions, plow means containing a wedge-shaped member positioned behind said cutting means and so disposed with respect thereto as to engage the partially cut portion of the fish, whereby the head portion will be forced outwardly and detached from the body of the fish and the entrails pulled outwardly with the head portion, and trimming means behind said plow means and in substantial alignment with said preliminary cutting means, whereby any remnants and entrails extending from the cut end of the body of the fish will be severed upon engagement with said trimming means.

2. In an apparatus for trimming fish, a head cutting and entrail removing mechanism, and conveyor means for carrying fish to said mechanism; to said means being adapted to operatively support fish transversely disposed to the direction of travel; said mechanism comprising preliminary cutting means so disposed with respect to the conveyor means as to be in the path of the head portions of fish operatively carried thereby, and so set as to partially cut through said head portions, plow means positioned behind said cutting means and comprising a separator blade and a wedge-shaped member therebehind, said blade and member being so disposed with respect to the cutting means as to successively engage the partially cut portion of the fish, and trimming means behind said plow means, said preliminary cutting means, separator blade, the leading edge of the wedge-shaped member and the trimming means being in substantial alignment whereby any remnants and entrails extending from the cut end of the body of the fish will be severed upon engagement with said trimming means.

3. In an apparatus for trimming fish, a head cutting and entrail removing mechanism, and conveyor means for carrying fish to said mechanism; said means being adapted to operatively support fish transversely disposed to the direction of travel; said mechanism containing preliminary cutting means comprising a rotary blade so disposed with respect to the conveyor means as to be in the path of the head portions of fish operatively carried thereby, and so set as to partially cut through said head portions, plow means containing a wedge-shaped member positioned behind said cutting means, the leading edge of said member being so disposed with respect to the said cutting means as to engage the partially cut portion of the fish, whereby the head portion will be forced outwardly and detached from the body of the fish and the entrails pulled outwardly with the head portion, and trimming means comprising a rotary blade behind said plow means and in substantial alignment with said preliminary cutting means, whereby any remnants and entrails extending from the cut end of the body of the fish will be severed upon engagement with said trimming means.

4. In an apparatus for trimming fish, a head cutting and entrail removing mechanism, conveyor means for carrying fish to said mechanism, and supporting means for the fish in coactive relation with said mechanism; said conveyor means being adapted to operatively support fish transversely disposed to the direction of travel; said mechanism comprising preliminary cutting means so disposed with respect to the conveyor means as to be in the path of the head portions of fish operatively carried thereby, and so set as to partially cut through said head portions, plow means containing a wedge-shaped member positioned behind said cutting means and so disposed with respect thereto as to engage the partially cut portion of the fish, whereby the head portion will be forced outwardly and detached from the body of the fish and the entrails pulled outwardly with the head portion, and trimming means behind said plow means and in substantial alignment with said preliminary cutting means, whereby any remnants and entrails extending from the cut end of the body of the fish will be severed upon engagement with said trimming means; said supporting means comprising a stationary platform at a predetermined position below the said mechanism, whereby the head portions of the conveyed fish will be supported thereby at a predetermined level for operative engagement with said mechanism, the platform having a front downwardly inclined portion in advance of the said preliminary cutting means for engaging the undersides of approaching fish, the platform extending rearwardly at least to the region of said plow means.

5. In an apparatus for trimming fish, a head cutting and entrail removing mechanism, conveyor means for carrying fish to said mechanism, and supporting means for the fish in coactive relation with said mechanism; said conveyor means being adapted to operatively support fish transversely disposed to the direction of travel; said mechanism containing preliminary cutting means so disposed with respect to the conveyor means as to be in the path of the head portions of fish operatively carried thereby, and so set as to partially cut through said head portions, and plow means containing a wedge-shaped member positioned behind said cutting means and so disposed with respect thereto as to engage the partially cut portion of the fish, whereby the head portion will be forced outwardly and deatched from the body of the fish and the entrails pulled outwardly with the head portion; said supporting means comprising a platform at a predetermined position below the said mechanism, whereby the head portions of the conveyed fish will be supported thereby at a predetermined level for operative engagement with said mechanism, the platform being fixedly attached to the plow means, whereby said platform and plow means bear a fixed relation to the cutting means.

HERBERT P. SMITH.

REFERENCES CITED

The following references are of record in the file of this patent:

UNITED STATES PATENTS

| Number | Name | Date |
|---|---|---|
| 1,539,300 | Christiansen | May 26, 1925 |
| 1,632,200 | Stafford | June 14, 1927 |